(12) United States Patent
Qvarfordt et al.

(10) Patent No.: US 8,601,538 B2
(45) Date of Patent: Dec. 3, 2013

(54) MOTION AND INTERACTION BASED CAPTCHA

(75) Inventors: Pernilla Qvarfordt, Los Altos, CA (US); Eleanor G. Rieffel, Mountain View, CA (US); David M. Hilbert, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1987 days.

(21) Appl. No.: 11/508,423

(22) Filed: Aug. 22, 2006

(65) Prior Publication Data

US 2008/0127302 A1 May 29, 2008

(51) Int. Cl.
H04L 29/06 (2006.01)

(52) U.S. Cl.
USPC .................. 726/2; 726/21; 382/181; 709/225

(58) Field of Classification Search
USPC ............................................................ 726/2
See application file for complete search history.

(56) References Cited

U.S. PATENT DOCUMENTS

| | | | | |
|---|---|---|---|---|
| 5,732,230 | A * | 3/1998 | Cullen et al. | 715/764 |
| 6,556,224 | B1 | 4/2003 | Banno | |
| 6,935,945 | B2 * | 8/2005 | Orak | 463/9 |
| 7,533,411 | B2 * | 5/2009 | Goodman et al. | 726/21 |
| 2005/0229251 | A1 | 10/2005 | Chellapilla et al. | |
| 2008/0066014 | A1 * | 3/2008 | Misra | 715/846 |

FOREIGN PATENT DOCUMENTS

| | | |
|---|---|---|
| JP | 2000-148338 A | 5/2000 |
| JP | 2001-092785 A | 4/2001 |
| JP | 2003-315912 A | 11/2003 |
| JP | 2005-322214 A | 11/2005 |

OTHER PUBLICATIONS

Liao et al., Embedding Information within Dynamic Visual Patterns, 2004 IEEE International Conference on Multimedia and Expo (ICME).*
Lopresti, Daniel. "Leveraging the CAPTCHA Problem." H.S. Baird and D.P. Lopresti (Eds.): HIP 2005, LNCS 3517, pp. 97-110, 2005.*
Baird, H.S. and Bentley, J.L., Implicit CAPTCHAs. in *IS&T/SPIE Document Recognition & Retrieval XII Conference*, (2005), 191-196.
Chellapilla, K., Larson, K., Simard, P. and Czerwinski, M., Designing Human Friendly Human Interactive Proofs. in *Conference on Human Factors in Computing System (CHI)*, (New York, 2005), ACM Press, 711-720.
Chew, M. and Tygar, J.D., Collaborative Filtering CAPTCHAs. in *2nd International Workshop on Human Interactive Proofs*, (2005), Springer, 66-81.

(Continued)

*Primary Examiner* — Taghi Arani
*Assistant Examiner* — Narciso Victoria
(74) *Attorney, Agent, or Firm* — Sughrue Mion, PLLC

(57) ABSTRACT

An automated test to tell computers and humans apart is disclosed, comprising displaying on a computer screen an animation comprising of a foreground and a background, one of the foreground comprising a plurality of typographical characters and the other comprising partial obstruction of the typographical characters, and wherein the animation comprises relative motion between the background and foreground. The automated test may comprise displaying on a computer screen an image, and requiring the user to perform operation on the image to resolve an encoded solution. The test may also comprise displaying on a computer screen a video clip, and requiring a user to provide an input corresponding to subject matter presented in the video clip.

10 Claims, 3 Drawing Sheets

(56) References Cited

OTHER PUBLICATIONS

Chew, M. and Tygar, J.D., Image Recognition CAPTCHAs. in *7th Annual Information Security Conference (ISC 04)*, (2004), 268-279.
20050066201 Goodman, J.T. and Rounthwaite, R.L., Order-based human interactive proofs (HIPs) and automatic difficulty rating of HIPs, 2005.
Liao, W.-H. and Chang, C.-C., Embedding information within dynamic visual patterns. in *2004 IEEE International Conference on Multimedia and Expo*, 2004. ICME '04., (2004), IEEE, 895-898.
20050065802 Rui, Y. and Liu, Z., System and method for devising a human interactive proof that determines whether a remote client is a human or a computer program, 2005.
Tractinsky, N., Adi, S.-K. and Ikar, D. What is Beautiful is Usable. *Interacting with Computers*, 13 (2). 127-145, 2000.
von Ahn, L., Blum, M. and Langford, J. Telling Humans and Computers Apart Automatically. *Communication of the ACM*, 47 (2). 57-60, 2004.
Translation of Japanese Office Action issued in Japanese Application No. 2007-201795 dated Jul. 3, 2012.

* cited by examiner

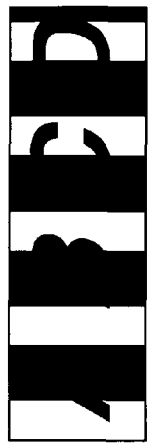
*Figure 3a*
*Figure 3b*
*Figure 3c*
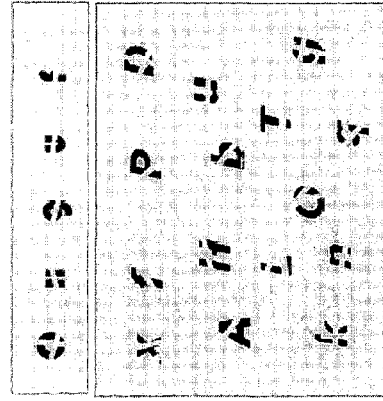
*Figure 5*
*Figure 2a*
*Figure 2b*
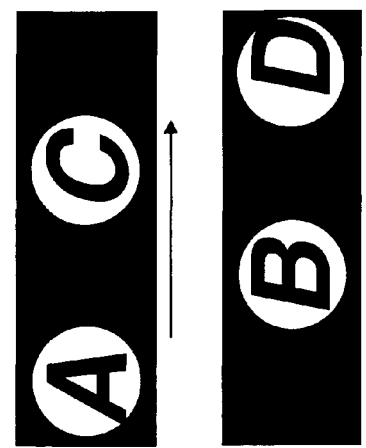
*Figure 4a*
*Figure 4b*
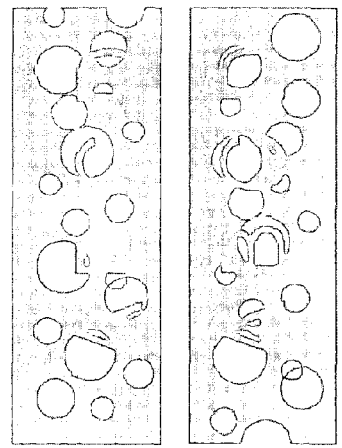
*Figure 1*
*Prior Art*

MOTION AND INTERACTION BASED CAPTCHA

BACKGROUND

1. Field of the Invention

The subject invention relates to the field of internet security and, more specifically, to validation of users accessing website.

2. Related Art

Providers of on-line information or services on the Internet often want or need to restrict access to the information or services offered on their websites. In many cases, simply allowing access to humans and not to a machine, e.g., a robot or crawler, provides some level of security against abuse for spam and other nefarious purposes. The method used today to ensure that the accessing party is human is called CAPTCHA (Completely Automated Public Turing Test to Tell Computers and Humans Apart) or Human Interactive Proofs. The idea behind CAPTCHAs is that there are tasks that humans are better at than computers. By providing a test easy for humans to solve but hard for computers, the service providers can increase the likelihood that their users are humans. The security bar is fairly low in that designers of CAPTCHAs only need to create CAPTCHAs that are sufficiently hard that it would be more economical to entice people to solve the CAPTCHAs than to create programs to solve them.

The commercially used CAPTCHAs often use a string of letters and digits randomly generated and morphed so they would be harder for optical character recognition (OCR) or other pattern recognition algorithms to recognize. However, there are also limitations to how much the letters can be distorted and yet be recognizable to humans. One often cited threshold is that humans' success rate should be 90%, while computers' should only be 0.01%. Even with a human success rate of 90%, the users will fail one out of ten trials which causes frustration towards the service provider. In addition, due to large individual variations in the human perceptual system, the distorted letters can be hard to read for many people and lead to exclusion of these users. For this reason it is highly desirably to create CAPTCHAs that are as easy as possible to solve by humans yet preserve or increase the difficulty for computers to solve them.

Some CAPTCHA designs, like logic puzzles or "which shape does not belong," have the feel of intelligence tests. For many service providers it is not advisable to question their users' intelligence, especially when they want to have as many users as possible. Instead CAPTCHAs should be almost trivial for a person to solve.

All aspects of a service provider's webpages affect a user's impression of the company. CAPTCHAs are often prominent on corporate pages. For this reason, the aesthetics of the CAPTCHAs are important. Currently the aesthetical aspects of the CAPTCHAs are overlooked in comparison to the security aspects. In addition, previous research has shown that users' perception of beauty influences their perception of the ease of use. The majority of CAPTCHAs use degraded text, images, or audio, which not only make the CAPTCHAs less easy for humans, but also make them less attractive.

Therefore, there is a need in the art for improved CAPTCHAs that are easy for human, but very difficult for a machine to solve, yet appear aesthetically pleasing.

SUMMARY

Various embodiments of the invention provide improved CAPTCHAs that form primarily a perceptual task, are easily resolved by human visual perception, and are difficult for machines to resolve.

According to aspects of the invention, various CAPTCHAs are generated that can be easily resolved by human sense of motion.

According to other aspects of the invention, CAPTCHAs are generated that are aesthetically pleasing. Such CAPTCHAs are not based on degrading images, but on obscuring images in a way that is both attractive and easily perceived by humans while not by machines.

According to an aspect of the invention, an automated test to tell computers and humans apart is disclosed, which comprises: displaying on a computer screen an animation comprising of at least a first layer and a second layer, one of the first layer and second layer comprising a plurality of recognizable images and the other comprising partial obstruction of the recognizable images, and wherein the animation comprises relative motion between the first and second layer. The animation may include two or more layers, each layer may be stationary or movable. The motion of each movable layer can be made automatic, as in an animation loop, or in response to a user input, such as by "grab and drag."

According to an aspect of the invention, an automated test to tell computers and humans apart is disclosed, comprising displaying on a computer screen an animation comprising of a foreground and a background, one of the foreground comprising a plurality of typographical characters and the other comprising partial obstruction of the typographical characters, and wherein the animation comprises relative motion between the background and foreground. The typographical characters may be provided in an incomplete form. The animation may be played automatically or in response to a user input. The method may further include monitoring keyboard or other user input device activity as the animation is presented.

According to another aspect of the invention, an automated test to tell computers and humans apart is provided, comprising displaying on a computer screen an image, and requiring the user to perform operation on the image to resolve an encoded solution. The operation may comprise moving part of the image using a user input device. According to another aspect, the operation may comprise matching part of the image with another part of the image, or matching part of the image with another part of another image. According to a further aspect, the operation may comprise matching typographical characters presented in a first set with typographical characters presented in a second set. The attributes of characters presented in the first set may be different from attributes of corresponding characters presented in the second set. The attributes may comprise at least one of capital case, lower case, size, bold, font, color, shading and italic. Each of the characters may be presented in an incomplete form. According to an aspect of the invention, the matching comprises using a user input device to move each character from the first set into a position overlapping a corresponding character of the second set.

According to yet another aspect of the invention, an automated test to tell computers and humans apart is provided, comprising displaying on a computer screen a video clip, and requiring a user to provide an input corresponding to subject matter presented in the video clip. The user may be required to provide an input when the subject matter presented in the video clip has changed. The user may be required to type typographical characters corresponding to typographical characters presented in the video clip. The user may be required to solve the test by typing the subject matter of the video clip. The user may be provided with a second video clip and be required to solve the second test by typing a second subject matter corresponding to the second video clip and, if the user properly solves the test, storing the user's solution of the second test to compare to other users' solutions of the second test. Then, when a statistically significant number of solutions to the second test have been received, the method proceeds by determining whether the second test is valid and, if so, selecting a solution most commonly entered for the second test as being a proper solution.

Other aspects and features of the invention will become apparent from the description of various embodiments described herein, and which come within the scope and spirit of the invention as claimed in the appended claims.

BRIEF DESCRIPTION OF THE DRAWINGS

The invention is described herein with reference to particular embodiments thereof, which are exemplified in the drawings. It should be understood, however, that the various embodiments depicted in the drawings are only exemplary and may not limit the invention as defined in the appended claims. Furthermore, because various embodiments of CAPTCHAs described herein involve motion, the static drawings cannot fully depict every element of these CAPTCHAs, but nevertheless, the artisan can fully understand the construct from the static drawings when viewed in conjunction with the relevant disclosure.

FIG. 1 depicts a CAPTCHA according to the prior art.

FIGS. 2a and 2b illustrate an animated CAPTCHA generated according to an embodiment of the invention.

FIGS. 3a and 3b depict another example of a motion-based CAPTCHA.

FIG. 3c illustrate the embodiment of FIGS. 3a and 3b, modified so that parts of the characters are missing throughout the complete animation.

FIGS. 4a and 4b depict an interactive CAPTCHA according to an embodiment of the invention.

FIG. 5 depicts another interactive CAPTCHA according to an embodiment of the invention.

DETAILED DESCRIPTION

Figure 6:
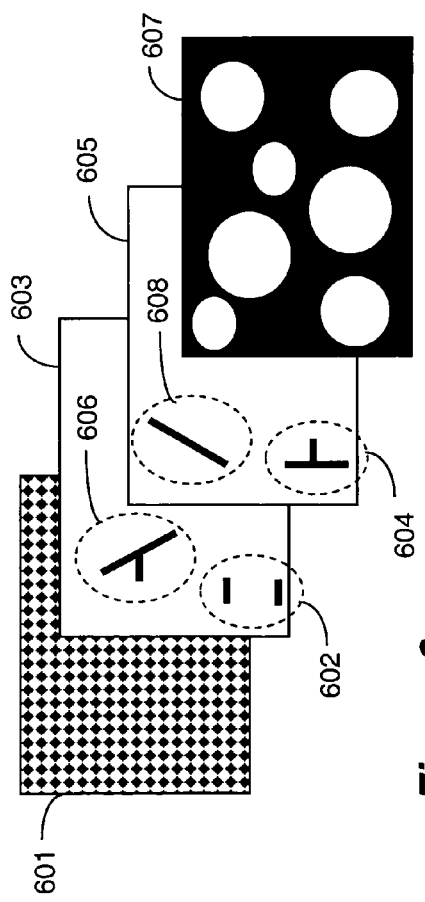
FIG. 6 depicts an example of a multi-layer CHAPTCHA according to an embodiment of the invention.

Various embodiment of the present invention enable designing CAPTCHAs that require primarily a perceptual task to resolve. Such CAPTCHAs require a task that could be performed without the intelligence associated with human beings, but rather by using human's perception of motion and ability to process visual cues.

Human perception and visual processing is tuned to perceive and make sense of motion. One example of this is the old invention of tachyscope. A tachyscope makes still images come alive by attaching them to a cylindrical board and spinning the board, while keeping the eyes on a specific location of the board. Similarly, when driving past a fence with vertical openings between the boards, the view of the scenery on the other side of the fence appears uninterrupted until the car is stopped. In psychology, this effect is referred to as anorthoscopic perception. These examples show how human visual systems excel at integrating low resolution or conflicting images into apparently high resolution and complete images over time. This phenomenon is utilized in various embodiments of the invention.

FIG. 1 depicts a CAPTCHA according to the prior art. As can be seen, the CAPTCHA is basically the four letters "SMWM" depicted in a distorted form. The distortion makes it difficult for OCR algorithm, but is rather simple for humans to decipher. However, various algorithms have been developed that gain some success in resolving such CAPTCHA. On the other hand, FIGS. 2a and 2b illustrate an animated CAPTCHA generated according to an embodiment of the invention, wherein a foreground layer partially obstruct the solution. The task in the example of FIGS. 2a and 2b is also to decipher the letters presented, in this example "ABCD." However, in this embodiment the letters are not distorted. Rather, the CAPTCHA is in the form of a looped animation, wherein the foreground always obstruct part of the solution. That is, motion is imparted either to the letters, to the foreground, or to both. In the example illustrated in FIGS. 2a and 2b, the letters are moving upwards, while the foreground is moving from right to left. That is, FIGS. 2a and 2b are "snap shots" of the CAPTCHA animation at two different points in times. As can be understood, when the complete animation is presented to a user in a continuous manner, the user will be able to easily decipher the letters, as at each point in time the user will see part of the solution and will be able to easily integrate the parts to decipher the whole. On the other hand, an OCR algorithm would not be able to decode this CAPTCHA, since the letters are never shown in a complete form. Also, as can be seen from FIGS. 2a and 2b, such a CAPTCHA is more aesthetically pleasing, as it almost appears as a game.

As can be understood, while the example of FIGS. 2a and 2b show moving bubbles as a foreground, other foregrounds can be used, so long as at each point in time only parts of the letters are shown, while other parts are covered. To illustrate, FIGS. 3a and 3b depict another example of a motion-based CAPTCHA. In this example, the letters "ABCD" are stationary, but the vertical black lines move from right to left. As can be understood, part of a vertical line will always cover a part of each letter. Therefore, none of the letters is ever shown completely exposed. However, when the lines are moving, human can perceive the letters easily. In the depicted example, the letters and moving foreground are shown in black and white. However, for a more pleasing experience, the letters and foreground can be provided in any desired color. Still, for best secure results, the foreground and letters should be of the same color. Also, while the examples here are given in terms of letters, any typographical character can be used, e.g., numbers, shapes, symbols, etc. Therefore, in this specification we refer to the term "encoded solution" as encompassing any of the characters that may be used in the CAPTCHA, such as letters, numbers, etc. Furthermore, as will be discussed below, the solution need not necessarily be a typographical character, but can be any recognizable image, which also comes under the term "encoded solution."

As can be understood, the animated CAPTCHA are similar to the prior art CAPTCHAs in that both use characters as the encoded solution. However, prior art CAPTCHA's are of a single-frame, while inventive animated CAPTCHAs use multiple frames. The motion created by playing the frames makes the message perceptually pop out and it becomes easy to decode for humans. However, since the inventive animated CAPTCHAs provide more frames that can be machine-processed to solve the problem, more data is available for automatically breaking the animated CAPTCHA. Accordingly, when generating the animated CHAPTCHA, it is advisable to follow the following guidelines:

The set of characters may be a larger class than letters. As noted above, other symbols can be used; however, the symbols need to be well known for the group of users. A possible class of symbols could consist of easily recognizable items, for example, animals or fruits and vegetables. Depending on the level of security that is needed for the system, letters and digits might be a good enough choice. Variations can include, Arabic numerals, Roman numerals, shapes, typographical characters, such as #, &, @, etc.

While the encoded solution or the background alone can be moving, for best results both the foreground/background and the encoded solution should be moving. In addition, distracting elements could be moving in the same direction as the encoded solution. This makes time averaging over the frames and tracking of the message harder. Also, while the examples are given in terms of foreground and background, multiple layers can be used, wherein each layer may be moving or stationary. The motion of each layer may be independent of the motion of any other layer. Furthermore, the motion can be automatic, i.e., a continuous loop, or manual in response to a user's command. A manual motion can be, for example, the clip plays a number of frames in response to a user's mouse click, or motion is made in response to user's "dragging" of selected layer using a mouse or other input device, or a specific motion that depends on the user's action, e.g., foreground moves to left upon left-mouse click and to the right upon right-mouse click.

The portions of the encoded solution that are visible should be changing over time. In addition, the sum of all frames can be set as not to give a complete image of the encoded solution. As is known, human perception is very good at "completing the picture" even when elements are missing. This is exemplified by the embodiment shown in FIG. 3c, which is generally the embodiment of FIGS. 3a and 3b, modified so that parts of the characters are missing throughout the complete animation. That is, the parts are missing even if all of the frames are put together. In this example, the parts are deleted by running two blocking lines 300 across the image; however, other method can be used. To generalize, the embodiment of FIG. 3c is generated by presenting the typographical characters in an incomplete form. That is, part of each letter is always missing.

The color of the message and the background/foreground should be matched so that the symbols cannot be trivially detected. If several colors are used, the colors should be chosen so that when converting the image to black and white, the colors would be in the same gray nuance. If several layers are used, each of different color, their overlap can be set to provide the same gray nuance as the solution.

According to another aspect of the invention, interactive CAPTCHA are generated, which are easily solved by a human, but difficult for a machine to solve. Interactive CAPTCHA requires the user to perform some actions to view or construct a hidden message. The actions can either be mouse input or keyboard input (for example arrow keys). An interactive CAPTCHA can, for example, ask the user to move the background/foreground to get a different view of the message. This example is illustrated in FIGS. 4a and 4b. FIG. 4a depicts the first frame of the interactive CAPTCHA. As can be seen, the foreground exposes only part of the encoded solution. In order to view the rest of the encoded solution, the user must take an action, such as move the foreground in the direction of the arrow, so as to expose the other parts of the message as shown in FIG. 4b. Of course, rather than moving the foreground, the user may also be asked to move the encoded solution itself, so that the remainder appears through the openings in the foreground.

As can be understood, the embodiment of FIGS. 4a and 4b can be implemented using animation CAPTCHA as well. That is, the embodiment of FIGS. 4a and 4b can be implemented as an animation clip that requires the user's input in order to play the sequence. For example, the animation can be generated to move the foreground from left to right, as is shown by the arrow; however, the animation is not set in motion until the user takes an action, such as click the mouse or press "enter" on the keyboard. In this sense, the embodiment of FIGS. 2a and 2b can be thought of as automatic animation CAPTCHA, while that of FIGS. 4a and 4b a manual CAPTCHA. Conversely, the embodiments of FIGS. 2a, 2b, and 3a-3c can be made as an interactive CAPTCHAs, i.e., the user must take an action to cause a motion, such as dragging a layer or clicking to set the clip in motion or to play part of the clip.

Another example is that the CAPTCHA asks the user to perform a matching task. Such an example is illustrated in FIG. 5. The Example of the interactive CAPTCHA of FIG. 5 asks the user to match the letters in the top field with the letters in the bottom field. The matching can be done, e.g., by selecting and dragging a letter from the top field and placing it on top of its counterpart in the bottom field, or vice versa. As shown in the example of FIG. 5, the task is made more difficult for a machine to resolve by interchanging the characters attributes, e.g., Capital and Lower-Case letters on the top and bottom field. Other changes can include the use of different font, different attributes, such as size, bold, italic, color, shading, etc. In this manner, the matching is not only of a shape, but requires knowledge of the alphabet and its printable and usage variations. As is also exemplified in FIG. 5, none of the typographical characters is depicted in a complete form. Part of each typographical character is missing. This can be easily overcome by humans, but may present a challenge to a computer to resolve.

According to another embodiment, in addition to the user's solution to the CAPTCHA, the user's actions (keyboard or mouse input) can be tracked using conventional means. Based on this information, the CAPTCHA can determine if the actions correspond to natural human behavior or if they could be computer generated.

According to yet another embodiment, video-based CAPTCHAs are generated. The video-based CAPTCHAS ask a user to provide a response based on what is presented in a video clip. Possible questions could be, for example:

What activity is being performed in the video clip? For enhanced security, the activity should not be deducible from a single frame or pair of frames.

When does a person change activities in the video clip?

Is this real life or science fiction video clip?

Is this object moving forward, backwards, or staying still? There could be camera motion, object motion, or both.

Is the segment running forward, backwards, or in fast forward mode?

What emotion are the people in the segment displaying?

FIG. 6 depicts an example of a multi-layer CAPTACH wherein the solution is divided and distributed among various layers, in this example, two layers 603 and 605. In this example there is also a background layer 601 and an obstruction foreground layer 607. Any of the layers can be moving under any of the methods described above, e.g., closed loop animation, user interaction, etc. The idea here is that in addition to the foreground layer partially obstructing the solution, the layers comprising the solution must also be aligned in order to decipher the solution. In this example, when layers 603 and 605 are aligned, the partial solutions encircled by ovals 602 and 604 form the completed solution "E", while the partial solutions encircled by ovals 606 and 608 form the complete solution "A." That is, each layer includes a partial solution that is complementary to a partial solution included in another layer or layers (i.e., the solution can be distributed among more than two layers).

Figure 7B:
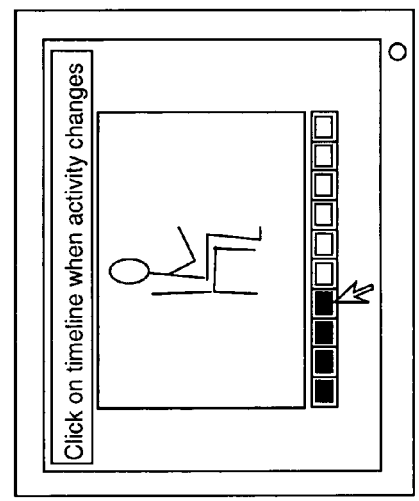
FIGS. 7a and 7b depict an example of a video CAPTCHA according to an embodiment of the invention.
Figure 7A:
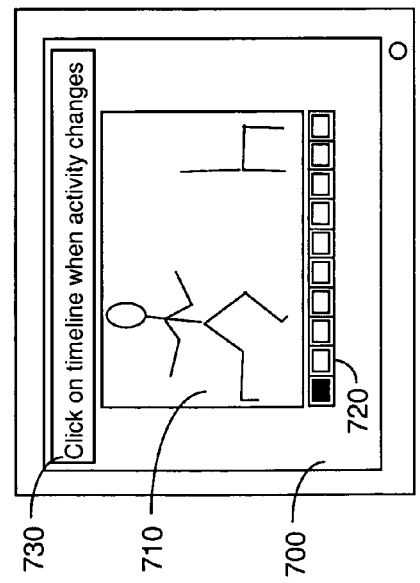

FIGS. 7a and 7b depict an example of a video CHAPTCHA according to an embodiment of the invention. As is shown in FIG. 7a, a video clip 710 is played, depicting a person running from left to the right side of the screen 700. A timeline 720 is presented in the form of a bar having empty rectangles therein, which are being filled progressively from left to right as time passes, i.e., as the playing of the video clip progresses. A caption, 730, asks the user to perform a task that relies on information conveyed in the video clip. In this example, the user is requested to click on the timeline when the activity on the screen changes. As shown in FIG. 7b, when the fourth time rectangle has been filled, the person ceased running and is shown seated on a chair. At this time, if the user clicks on the timeline, it is interpreted as a correct solution to the CAPTCHA. On the other hand, the user may be allowed to click at any time, as long as the user clicks at the proper location on the time bar, in this example, the fourth filled time rectangle. This allows the user to provide a delayed response.

Figure 8A:
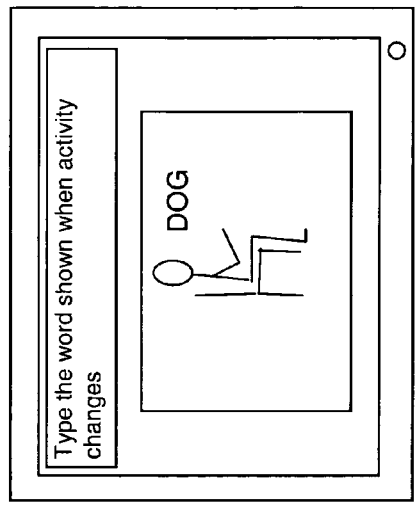
FIGS. 8a and 8b depict an example of a video CAPTCHA employing random elements feature.
Figure 8B:
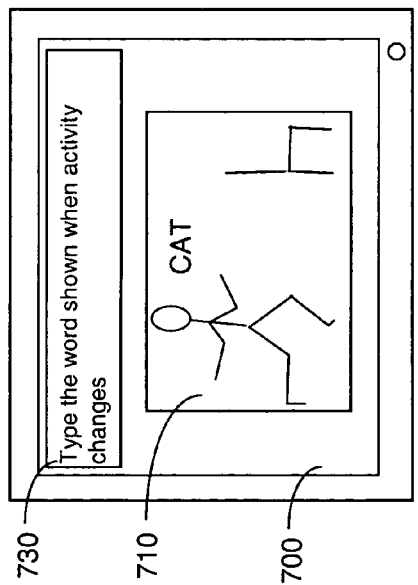

According to yet another embodiment, an element is added to the video, such as a message (or question, or object, etc.) that changes over time. The user is then asked to type the message (or answer the question, or identify the object) that is displayed at the time the user notices a specific semantic feature in the video. The additional element need not be obscured since the main challenge is identifying semantic video features. An example of a video CAPTCHA employing the added elements feature is shown in FIGS. 8a and 8b. FIGS. 8a and 8b depict an embodiment wherein the element that is shown in the screen is random, and the user is asked to type the element that is shown at the time the subject matter of the video changes. In the example of FIGS. 8a and 8b, the video clip shows a person running (e.g., FIG. 8a) and various random words are flashing on the screen, e.g., "cat" in FIG. 8a. When the subject matter of the video changes, e.g., the person in the video is seated in FIG. 8b, the user is asked to type the random word that appeared at the time, here the word "dog."

One problem with CAPTCHAs, particularly those based on images, video, or interaction, is that it can be hard to anticipate reasonable human responses. Part of the reason that the most deployed CAPTCHAs are letter based is that the correct response is unambiguous. The desire for an unambiguous label for each CAPTCHA severely limits the design space and opens the possibility to easier break the CAPTCHA. According to an embodiment of the invention, users are required to solve multiple CAPTCHAs consisting of two sets, one already vetted CAPTCHAs and a set of novel CAPTCHAs. A user does not know which is which and is required to attempt all elements of both sets. The answers to the first set determine whether the entity accessing the site is a human, and that information is used both to allow access to resources and to decide whether to use that entity's labels for the CAPTCHAs in the second set. The user's response to the second set is used to determine reasonable human responses to that CAPTCHA and assessing how vulnerable the CAPTCHA is for attacks. Once a CAPTCHA in the second category has been sufficiently vetted, it is moved to the first category. When the CAPTCHA is moved to the first category, a solution or a solution set is associated with it. That is, the decision to move the CAPTCHA can be made after a statistically significant number of solutions to the second test have been received. Then, either the highest scoring solution is chosen as a correct solution, or a set of most commonly received solutions is chosen as the correct solution and a user entering any of the solution from the set, is granted access.

Figure 9:
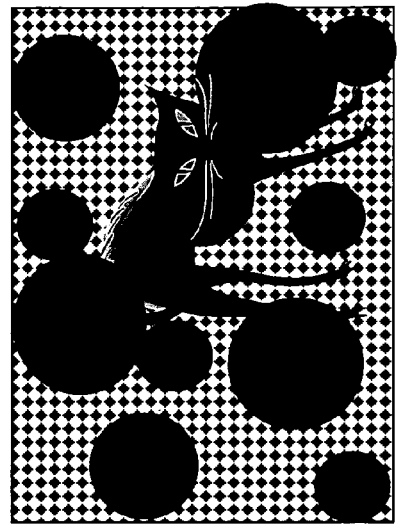
FIG. 9 depicts an example of a multiple layer embodiment.

While the invention has been described with reference to particular embodiments thereof, it is not limited to those embodiments. Specifically, various variations and modifications may be implemented by those of ordinary skill in the art without departing from the invention's spirit and scope, as defined by the appended claims. For example, each of the novel types of CAPTCHAs described can be incorporated in a number of different ways into more complex CAPTCHAs, like ones that ask the user to determine the odd one out, or the correct sequence, same set or different, topic of a set, etc. Similarly, hybrid CAPTCHAs that combine features from animated, interactive, and video CAPTCHAs are also possible. Additionally, as noted before, the CAPTCHAS can be made to have multiple layers. FIG. 9 depicts an example of a CAPTCHA having multiple layers. One layer comprises generally a background, such as a "wallpaper" having diamond shape pattern. Another layer includes the encoded solution, e.g., "A 2 C 5" illustrated in FIG. 9. Yet another layer comprises various obstruction elements, such as "floating disks" illustrated in FIG. 9. Any of the layers may be set stationary or movable. Also, as in the above examples, it can be set that none of the encoded solution element is ever completely exposed or, conversely, it can be set that each element of the encoded solution is an incomplete element, such as an incomplete letter or numeral character.

It should also be appreciated that the usage of "background" and "foreground" layers is meant for easy understanding of the various embodiments of the invention. However, the various embodiments are not necessarily restricted to usage of layers per se. Other methods can be used that do not define layers, but which provide the same functions and results as in the illustrative embodiments.

Figure 10:
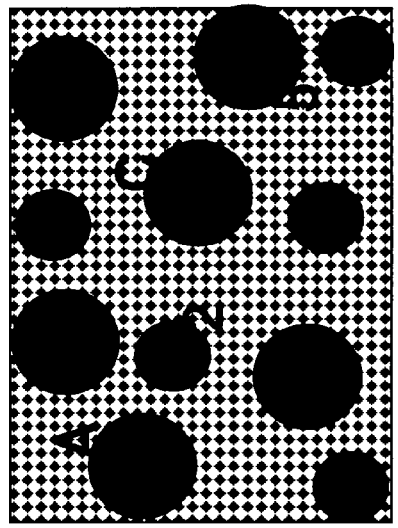
FIG. 10 depicts another example of an embodiment having multiple layers.

FIG. 10 depicts another example of an embodiment having multiple layers. However, in FIG. 10 the encoded solution is an image, rather than a typographical character. The user is then required to enter a word corresponding to the image. As before, the various layers can be set in motion automatically, such as in an animation clip, or in response to a user input. The user may also "pick and drag" any layer or one movable layer in order to properly expose the encoded solution.

What is claimed is:
1. An automated method of distinguishing a computer from a human, comprising:
   displaying on a computer screen an animation comprising at least a first layer and a second layer, one of said first layer and said second layer comprising a recognizable image and the other comprising a partial obstruction that obstructs a portion of the recognizable image and that does not obstruct an other portion of the recognizable image,
   wherein said animation comprises relative motion between said first and said second layer, the relative motion causing the obstructed portion of the recognizable image to become unobstructed, and the relative motion causing the other not obstructed portion of the recognizable image to become obstructed;
   receiving a reply to the displayed animation; and determining that the reply originated from a human based on the reply being consistent with an aspect of the recognizable image, wherein the animation further comprises a third layer, said third layer comprising a partial image that is at least partially complementary to said recognizable image provided in an incomplete form.

2. The method of claim 1, wherein said recognizable image comprises typographical characters.

3. The method of claim 1, wherein said animation is played automatically.

4. The method of claim 1, wherein said animation is played in response to a user input.

5. The method of claim 1, further comprising monitoring an output of a user input device as the animation is presented.

6. The method of claim 1, further comprising a third layer comprising a background image.

7. An automated method of distinguishing a computer from a human, comprising:
- displaying on a computer screen an image comprising at least a first layer and a second layer; and
- requiring a user to perform an operation to manipulate the image by moving one of the first layer and the second layer relative to the other of the first layer and the second layer to resolve an encoded solution,
- receiving a reply to the displayed animation; and
- determining, that the reply originated from a human based on the reply being consistent with an aspect of the recognizable image,
- wherein one of said first layer and second layer comprises a recognizable image and the other of the first layer and the second layer comprises a partial obstruction of said recognizable image and
- wherein the operation comprises moving one of the first layer and the second layer relative to the other of the first layer and the second layer, causing the portion of the recognizable image obstructed by the partial obstruction to become unobstructed, and the relative motion causing the other portion of the recognizable image unobstructed by the partial obstruction to become obstructed using a user input device.

8. The method of claim 7, wherein said resolving the encoded solution comprises moving one of the first layer and the second layer with respect to the other of the first layer and the second layer to match a part of the image with another part of the image.

9. The method of claim 7, wherein said resolving an encoded solution comprises moving one of the first layer and the second layer with respect to the other of the first layer and the second layer to match a part of the image with another part of another image.

10. The method of claim 7, further comprising monitoring an output of a user input device.

\* \* \* \* \*